United States Patent
Blanco

[19]

[11] Patent Number: 5,839,575

[45] Date of Patent: Nov. 24, 1998

[54] CONTAINER FOR FLAT ARTICLES

[76] Inventor: Allen R. Blanco, 12040 Race Track Rd., Tampa, Fla. 33626

[21] Appl. No.: 841,735

[22] Filed: Apr. 29, 1997

[51] Int. Cl.$^6$ ................................................ B65D 69/00
[52] U.S. Cl. .................. 206/232; 206/307.1; 206/308.1; 206/308.3; 206/473
[58] Field of Search .................................... 206/232, 307, 206/307.1, 308.1, 472, 473, 474, 308.3

[56] References Cited

U.S. PATENT DOCUMENTS

| | | | |
|---|---|---|---|
| 4,488,645 | 12/1984 | Yamaguchi | 206/444 |
| 4,635,797 | 1/1987 | Bankier | 206/472 |
| 4,717,021 | 1/1988 | Ditzig | 206/472 |
| 4,793,477 | 12/1988 | Manning et al. | 206/232 |
| 4,869,364 | 9/1989 | Bray | 206/232 |
| 4,895,252 | 1/1990 | Nomula et al. | 206/308.1 |
| 4,936,462 | 6/1990 | Yuen | 206/473 |
| 4,977,483 | 12/1990 | Perretta | 206/472 |
| 4,993,552 | 2/1991 | Bugbey et al. | 206/444 |
| 5,090,078 | 2/1992 | Kamakura et al. | 206/472 |
| 5,207,717 | 5/1993 | Manning | 206/232 |
| 5,290,118 | 3/1994 | Ozeki | 402/79 |
| 5,293,994 | 3/1994 | Antik | 206/232 |
| 5,515,967 | 5/1996 | Fitzsimmons et al. | 206/307.1 |
| 5,597,068 | 1/1997 | Weisburn et al. | 206/308.1 |
| 5,653,335 | 8/1997 | Bauer et al. | 206/307.1 |

FOREIGN PATENT DOCUMENTS 3027804 2/1982 Germany .

*Primary Examiner*—David T. Fidei
*Attorney, Agent, or Firm*—Joseph C. Mason, Jr.; Dennis G. LaPointe

[57] ABSTRACT

A receptacle for receiving, packaging, and displaying relatively flat articles including compact disks (CDs) and floppy disks (diskettes) in both round and rectangular configurations. The receptacle opens in book-like form with one side holding the disks by their edges and the other side having ridges for holding associated booklets. The disks may be removed by finger notches. A sealing flap integral to an outside printable cover functions to secure the receptacle from separating, especially for mailing and shipping.

12 Claims, 2 Drawing Sheets

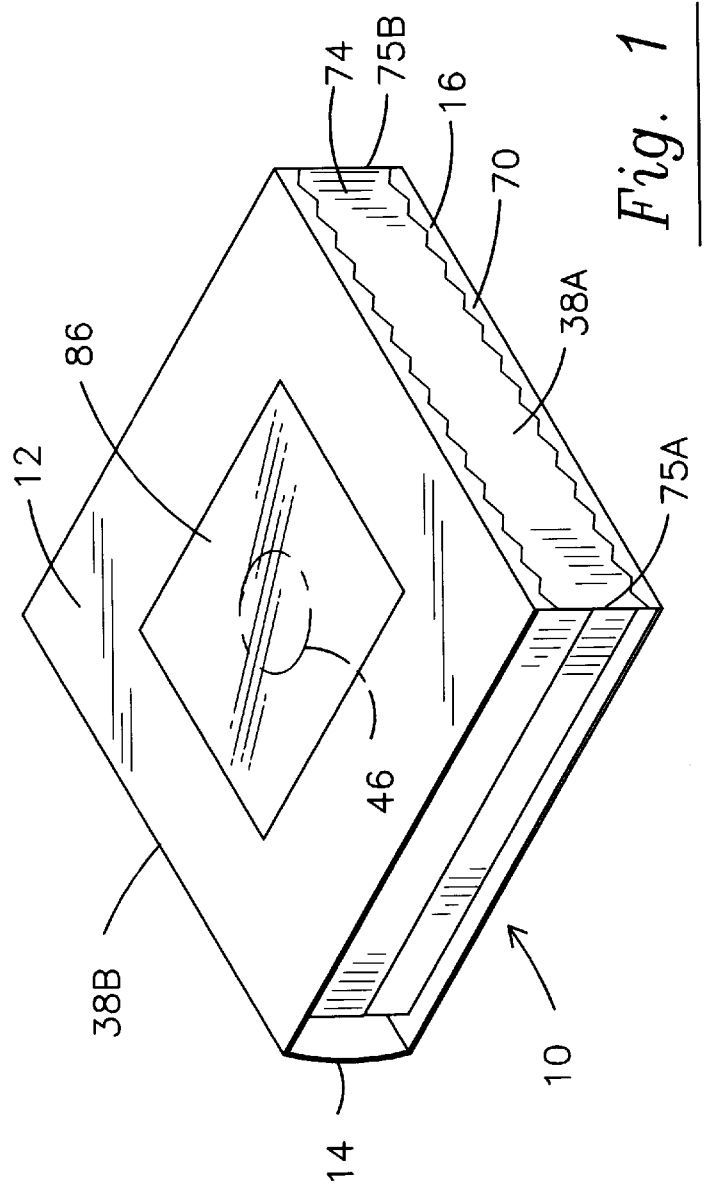
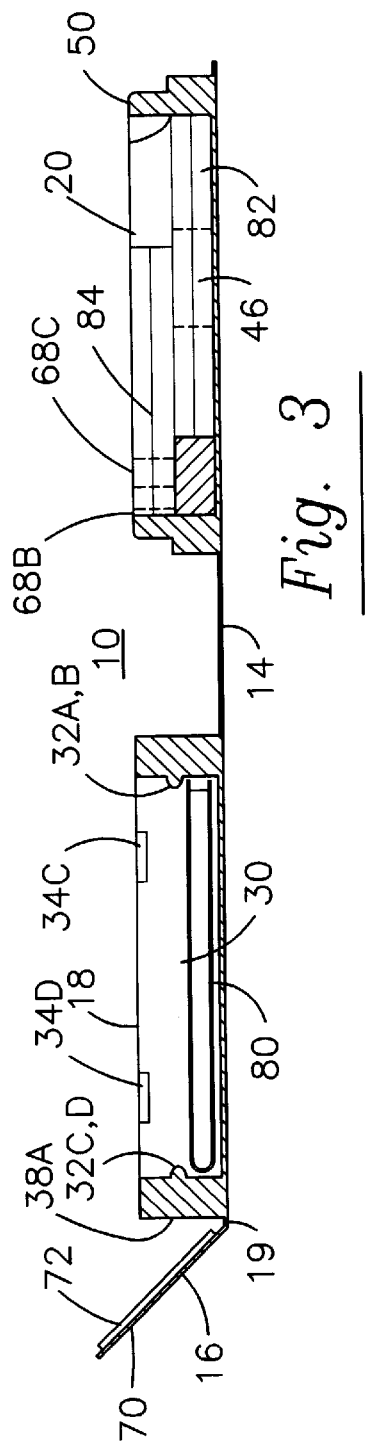
Fig. 1
Fig. 3

CONTAINER FOR FLAT ARTICLES

BACKGROUND OF THE INVENTION

1. Field of the Invention

The present invention relates to a receptacle or container that is designed to retain relatively flat articles. More particularly, the invention relates to a book-like container having a printable outside cover encasing an inner container for receiving and retaining flat articles, such as compact disks (CDs), floppy disks (diskettes), booklets and other written materials.

2. Description of Related Art

The rapid pace of national, international and global business transactions demands an efficient, quick, reliable and secure means for packaging, mailing, displaying and storing products and related written materials. In particular, all aspects of today's business and our personal lives are deeply affected by the widespread use of electronic products, computers, software, i.e., compact disks and floppy disks and a wide variety of audio/visual equipment. It is the software that constitutes the heart and brainwork of the hardware which coordinates to produce an infinite variety of functional end results. Thus, the compact disks (CDs) and floppy disks (diskettes) in conjunction with associated explanatory materials and brochures must be shipped and mailed with a minimal amount of packaging to be in compliance with environmental laws in today's world of throw away containers. At the same time, this packaging must be cost effective to ship and produce. The present invention does eliminate duplicate packaging, and at the same time, protects the mentioned flat-type articles for all intended purposes, including storing, displaying, shipping and mailing.

It has been the practice to provide a variety of folders, carriers, covers and storage containers for compact disks and floppy disks. Our extensively used package is the "jewel box" which is used to house a compact disk, particularly in the music industry. Illustrations of these practices may be found in the following U.S. Pat. Nos. 4,488,645, 4,793,477, 4,869,364, 4,993,552, 5,207,717, 5,290,118, 5,515,967 and 5,595,068. These patents generally disclose book-type holders for CD, floppy disk and cassette storage, and upon being opened, display. Some of these patents disclose a transparent viewing opening for display of stored articles without opening the holder.

SUMMARY OF THE INVENTION

It is, therefore, an object of the subject invention to provide a receptacle which holds software of any geometric form, and in particular, compact disks (CDs) and floppy disks (diskettes) in both round and rectangular packaging.

It is the further object of this invention to provide a receptacle which is suitable for packaging, shipping and mailing flat articles which opens and closes in book-like form.

It is the further object of this invention to provide a receptacle which may be securely sealed for purposes of shipping and mailing, and in particular, shipping and mailing of software which requires a high degree of confidentiality as in licensing transactions and when sent to the United States Copyright Office.

It is the further object of this invention to provide a receptacle which eliminates unnecessary and duplicate packaging, and thus, is cost effective to ship or mail because of less material and lower freight costs.

It is the further object of this invention to provide a receptacle which is cost effective to produce and manufacture.

It is the further object of this invention to provide a receptacle which is designed with a unique and secure sealing means.

It is the further object of this invention to provide a receptacle which is anti-static, dust resistant and which will not distort or destroy its contents.

It is the further object of this invention to provide a receptacle which complies with all environmental laws, is recyclable and reduces the amount of packaging going into landfills.

It is the further object of this invention to enhance retail sales of its contents by offering a good means for displaying and viewing the contents of the receptacle.

It is the further object of this invention to provide a receptacle which is printable on an outside cover.

It is the further object of this invention to provide a receptacle in book-like form which is compact and may be stood on its end like a book in a library providing for compact and efficient storage.

It is the further object of this invention to provide a receptacle which is capable of holding a variety of flat articles and other products, such as small tools and cosmetics.

It is the further object of this invention to provide a receptacle which is made of a cost-effective material yet retains rigidity for packaging, mailing and displaying of its contents.

And yet, a still further object of this invention the general nature of which is to provide a receptacle for receiving, packaging, mailing and displaying relatively flat articles, which receptacle is opened and closed in book-like form, comprising an outside cover flexibly encasing an inner container consisting of a pair of cooperative opposing quadrilateral trays of rigid material constructed to receive and retain said articles; a binding means of said outside cover located central to said trays being integral to said cover to function as a pivotal support axis allowing said receptacle to fold to a closed position for sealing of said receptacle and unfold to an open position for viewing and use of said flat articles; a sealing means integral to said cover located along a first side of said receptacle being common to said quadrilateral trays and opposite said binding means located on a second side of said receptacle common to said quadrilateral trays, whereby said sealing means functions to secure said receptacle from separating at opposing contact surfaces of said two cooperative opposing quadrilateral trays when said receptacle is in a closed book-like form.

Thus, the container of this invention has a desired container depth and geometric configuration within two separate trays. The inventive container embodies a sealing means in combination with a plurality of flanges and coordinating notches located on opposing walls of the referenced trays which enable this container or receptacle to be secured in a closed book-like form. The container of the present invention preferably has dimensions which meet the specification of the U.S. Postal Service to qualify as a mailer. It is also designed to open like a book for ease of viewing its contents by a customer.

Another object of this invention is to provide a receptacle for holding relatively flat articles comprising a hollow housing; the hollow housing being formed by a pair of mating casing halves; a first mating casing comprising a cover having a first quadrilateral tray thereunder; a second mating casing comprising a base constructed with a second quadrilateral tray to receive at least a portion of the articles; the first mating casing and the second mating casing being hingedly attached along at least a portion of a first common mating surface edges sufficient for movement relative to the first and second mating casing between open and closed positions; and sealing means along at least a portion of a second common mating surface edge.

The invention accordingly comprises the features of construction, combination of elements and arrangement of parts that will be exemplified in the construction set forth hereinafter and the scope of the invention will be set forth in the claims.

BRIEF DESCRIPTION OF THE DRAWINGS

These objects, as well as other novel features and advantages of the subject invention, will be better appreciated and understood when the following description is read along with the accompanying drawings, in which:

FIG. 1 is a perspective view of a closed receptacle flat articles;

FIG. 3 is a cross-sectional view of an open receptacle for displaying flat articles showing its contents, namely: a booklet, compact disks and floppy disks.

Similar reference numerals refer to similar parts throughout the several views of the drawings.

DETAILED DESCRIPTION OF THE INVENTION

Figure 2:
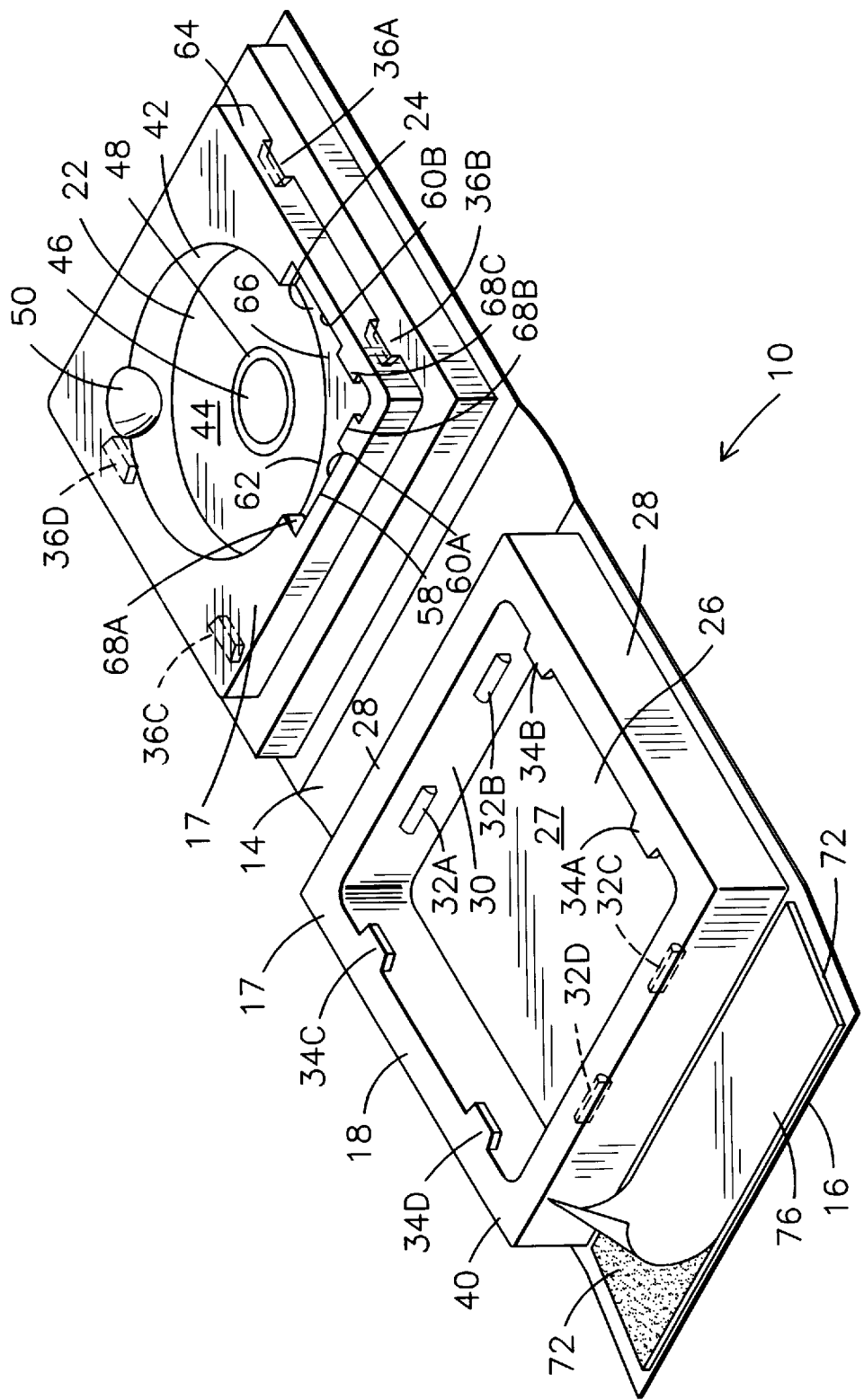
FIG. 2 is a perspective view of an open receptacle for flat articles.

FIG. 1 of the present invention illustrates a schematic perspective view of receptacle 10 shown in a closed booklike form. Receptacle 10 consists of a cover or lid 12 which encases an inner container 17 which is hingedly movably mounted to open and close about a binding member 14. Sealing flap 16 is integral to cover 12 and is seen at an opening end of receptacle 10. Sealing flap 16 functions to secure receptacle 10 for packaging, mailing and storing purposes.

FIG. 2 and FIG. 3 of the present invention illustrate receptacle 10 in its open book position which is the position it must take for insertion and removal of flat articles like booklet 80, compact disks (CDs) 82 and floppy disks (diskettes) 84. Inner container 17 consists of first holding tray 18 and second holding tray 20 which are essentially quadrilateral in configuration at their perimeter and operate in a cooperative opposing manner when receptacle 10 is opened or closed. Inner container 17 is one integral part constructed of vacuum-formed PVC (polyvinyl chloride), polypropylene, polyethylene or other material giving first holding tray 18 and second holding tray 20 a relatively rigid form. Inner container 17 is generally heat sealed to cover 12 which preferably is made of a printable paperboard-type material or any other printable material. Receptacle 10 is constructed preferably with an opening or window of transparent material which may extend through at least a portion of cover 12 and at least one side of inner container 17 in order to provide a viewing window 86 for viewing flat articles contained in inner container 17.

First holding tray 18 is a recessed quadrilateral cavity 26 defined by a first upstanding quadrilateral wall 28 for holding printed materials like booklets 80 which lay flat on quadrilateral surface 27. Booklets 80 are held firmly within first holding tray 18 by a plurality of ribs shown as 32A, 32B, 32C and 32D which are located laterally on an inner surface 30 of first upstanding quadrilateral wall 28.

Second holding tray 20 is defined by a second upstanding wall 58 and consists of a first lower recessed cavity 22, preferably circular, for holding compact disks (CDs) 82 and a second upper recessed, cavity or pocket 24, preferably square, for holding floppy disks (diskettes) 84. Compact disks (CDs) 82 are inserted into recessed cavity 22 by press-fitting compact disks 82 (CDs) at a circular inner aperture of compact disks 82 (CDs) over a spindle 46 and a circular ridge 48 which is concentric to spindle 46. Compact disks (CDs) 82 rest directly on circular surface 44 and are further secured by first circular wall 42 of recessed cavity 22. Floppy disks (diskettes) 84 are inserted into the at least partially square cavity 24 which is formed by two dog legs 60A and 60B which are approximately of equal length and an arced sector 62 which is cut by and intercepted by a circumference of recessed. cavity 22. Floppy disks (diskettes) 84 rest on partially square surface 66 of partially square cavity 24 and are secured by vertical projections 68A, 68B and 68C. Floppy disks (diskettes) 84 cooperatively overlay compact disks 82 commencing at arced sector 62. Finger notch 50 is located circumferentially to recessed cavity 22 and consists, preferably, of a three-dimensional quarter spherical shape integral to recessed circular cavity 22 for easy removal of compact disks (CDs) 82; although numerous other configurations of the finger notch 50 may be designed and used in this invention.

Sealing flap or strip 16 is located at first receptacle side 38A being the opened end of receptacle 10. Sealing flap 16 is a quadrilateral dimensioned configuration substantially conforming to the shape of first receptacle side 38A. Sealing flap 16 may be pivoted about an axis 19 in order to seal receptacle 10 and consists of an outer surface 70 and an inner adhesive surface 72 for adherence to first receptacle side 38A which is formed when receptacle 10 is in a closed book form as shown in FIG. 1. A peelable removable liner 76 is removed from adhesive surface 72 when receptacle 10 is ready for sealing. Otherwise, removable liner 76 is used to prevent sealable flap 16 from accidentally sticking to first receptacle side 38A. A tearable strip 74 is seen on an outer surface 70 of sealing flap 16 which functions to open receptacle 10 when it is in a sealed and closed position as shown in FIG. 1. A preferred embodiment of tearable strip 74 is perforated for easy removal by simply and lightly pulling on either end 75A or 75B. Tearable strip 74 may be constructed of any variety of means including a string or cord tear.

Receptacle 10 is sealed as previously stated by sealing flap 16 which acts in cooperation with a plurality of flanges 34A, 34B, 34C and 34D located around a perimeter of inner surface 30 of recessed quadrilateral cavity 26. When receptacle 10 is folded to a closed position, flanges 34A, 34B, 34C and 34D engage into a plurality of coordinately placed notches 36A, 36B, 36C and 36D located peripherally on outside upper surface 64 of second upstanding wall 58.

When receptacle 10 is in closed position, quadrilateral wall 28 joins with second upstanding wall 58 whereby top surface 40 of recessed quadrilateral cavity 26 contacts outside recessed ledge surface 52 of second upstanding wall 58 above a peripheral outside lower wall 54 of second upstanding wall 58.

The advantages of this invention clearly provide an important advance in the art of a receptacle for receiving, packaging, mailing and displaying relatively flat articles such as compact disks, floppy disks, booklets and other written materials.

It will thus be seen that the objects set forth above, and those made apparent from the foregoing description are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be paid to fall therebetween.

Now that the invention has been described,

What is claimed is:

1. A receptacle for receiving, packaging, and displaying relatively flat articles, which receptacle is opened and closed in book form, comprising:

a flexible outside cover of printable paperboard material;

a binding means of the outside cover being integral to the cover and centrally located to allow the receptacle to function in the book form for folding to a closed position whereby said receptacle may be sealed for the packaging, shipping and storing and further for unfolding to an open position for viewing and use of the flat articles;

an inner container of the receptacle consisting of a pair of cooperative opposing quadrilateral trays spaced apart by a width of the binding means constructed of a one piece vacuum formed polyvinyl chloride rigid material heat sealed to the outside cover and formed to receive and retain the articles, wherein a first of the trays is a quadrilateral cavity defined by a first upstanding wall for holding printed materials through a plurality of ribs located laterally on an inner surface of the first upstanding wall and a second of the trays defined by a second upstanding wall having a first lower circular cavity for holding compact disks by press fitting the compact disks at a circular inner aperture of the compact disks over a spindle located about a center point of the circular cavity, the spindle acting in cooperation with a circular ridge concentric to the spindle for accepting a circular recessed under sector of the compact disks and a second upper partially quadrilateral cavity for holding floppy disks through a plurality of vertically inward extending projections spaced on an inner surface of an upper dog leg sector of the second upstanding wall, whereby the floppy disks act to cooperatively overlay the compact disks commencing at an arced sector of the partially quadrilateral cavity connecting end points of the dog leg sector, the arced sector further defined by a circumference of the recessed circular cavity intercepting the partially quadrilateral cavity; and a sealing means integral to the cover along a first side common to the quadrilateral trays and opposing the binding means at a second side, consisting of at least one foldable adhesive flap at an open end of the receptacle along the first side, wherein the flap is of quadrilateral dimensioned configuration conforming to the open end for sealing the receptacle in the closed position in cooperation with a plurality of flanges located around a perimeter of the inner surface of the first upstanding wall of the quadrilateral tray for engagement to a plurality of coordinately placed notches located peripherally on an outside upper surface of the second upstanding wall of the partially quadrilateral tray further functioning to secure the receptacle for packaging, shipping and storing.

2. A receptacle for receiving, packaging, and displaying relatively flat articles, which receptacle is opened and closed in book form according to claim 1, wherein the foldable adhesive flap consists of an inner adhesive surface for adherence to outside adjoining walls of the trays when the receptacle is in closed position; a peelable removable liner to the outside of the adhesive surface for prevention of accidental adherence of the adhesive surface to the outside adjoining walls, and further comprising a tearable strip for opening the receptacle from a sealed position.

3. A receptacle for receiving, packaging, and displaying relatively flat articles, which receptacle is opened and closed in book form according to claim 2, wherein the receptacle is constructed such that an opening extends through a thickness of the outside cover and at least one of the quadrilateral trays such that the opening forms a viewing window for viewing of the flat articles without the necessity of opening said receptacle.

4. A receptacle for receiving, packaging, and displaying relatively flat articles, which receptacle is opened and closed in book form according to claim 1, wherein a finger notch is located circumferentially to said first lower cavity for easy removal of said compact disks.

5. A receptacle for holding relatively flat articles comprising:

a hollow housing;

the hollow housing being formed by a pair of mating casing halves;

a first mating casing comprising a cover having a first quadrilateral tray thereunder;

a second mating casing comprising a base constructed with a second quadrilateral tray to receive at least a portion of the articles;

the first mating casing and the second mating casing being hingedly attached along at least a portion of a first common mating surface edge sufficient for movement relative to the first and second mating casing between open and closed positions;

sealing means along at least a portion of a second common mating surface edge;

the sealing means further including at least one foldable adhesive flap at the portion of the second common mating surface edge; and the foldable adhesive flap further having an inner adhesive surface for adherence to outside adjoining walls of said trays in said closed position and a peelable removable liner to the outside of said adhesive surface for prevention of an accidental adherence to said outside adjoining walls.

6. Receptacle according to claim 5 wherein:

the first tray has a cavity formed therein defined by a first upstanding wall at the perimeter thereof;

the second tray has at least two cavities each of a defined shape and geometric configuration and further defined by a second upstanding wall at the outside limits of the geometric configuration; and whereby a first cavity in the second tray cooperatively shares an intersecting volume common to each of the cavities sufficient for receiving at least a portion of the flat articles.

7. A receptacle for receiving, packaging, and displaying relatively flat articles, which receptacle is opened and closed in book form, comprising:

an outside cover flexibly encasing an inner element consisting of a pair of cooperative opposing quadrilateral trays of rigid material constructed to receive and retain said articles wherein a first tray is a quadrilateral cavity defined by an upstanding wall for holding printed materials and a second tray consists of at least two cavities, a first circular cavity for holding compact disks and a second partially quadrilateral cavity for holding floppy disks, said circular cavity and said partially quadrilateral cavity are both further defined by a common wall;

said first tray further including a plurality of ribs located laterally on an inside surface of said upstanding wall of said quadrilateral cavity for retaining said printed materials in a fixed position and said second tray having a spindle central to said circular cavity for holding the compact disks in a fixed position and said second tray further having a plurality of vertically extending projections located on an inside surface of said upstanding wall of the partially quadrilateral cavity for holding the floppy disks in a fixed position;

a binding means of said outside cover located central to said trays being integral to said cover to function as a pivotal support axis allowing said receptacle to fold to a closed position for sealing of said receptacle and unfold to an open position for viewing and use of the contents constituting primarily said flat articles;

a sealing means integral to said cover located along a first side of said receptacle being common to said quadrilateral trays and opposite the binding means located on a second side of said receptacle common to said quadrilateral trays, whereby said sealing means functions to secure said receptacle from separating at opposing contact surfaces of the two cooperative opposing quadrilateral trays when said receptacle is in said closed position;

the sealing means further including at least one foldable adhesive flap at an open end being said first side of said receptacle for sealing said receptacle; and the foldable adhesive flap further having an inner adhesive surface for adherence to outside adjoining walls of said trays in said closed position and a peelable removable liner to the outside of said adhesive surface for prevention of an accidental adherence to said outside adjoining walls.

8. A receptacle for receiving, packaging, and displaying relatively flat articles, which receptacle is opened and closed in book form according to claim 7, wherein said foldable adhesive flap is of a quadrilateral dimensioned configuration conforming to the shape of said open end of said receptacle and further comprising a tearable strip for opening said receptacle from a sealed position.

9. A receptacle for receiving, packaging, and displaying relatively flat articles, which receptacle is opened and closed in book form according to claim 7, wherein said first tray has a plurality of ribs located laterally on an inside surface of said upstanding wall of said quadrilateral cavity for retaining said printed materials in a fixed position and wherein said second tray has a spindle for holding said compact disks in a fixed position, wherein the spindle is located about a center point of said circular cavity and functions in cooperation with a concentrically located circular ridge to hold the compact disks in a fixed position and wherein said second tray has a plurality of vertically extending projections located on an inside surface of said upstanding wall of said partially quadrilateral cavity for holding said floppy disks in a fixed position.

10. A receptacle for receiving, packaging, and displaying relatively flat articles, which receptacle is opened and closed in book form according to claim 9, wherein a plurality of flanges are located on the inside surface of the upstanding wall of the quadrilateral cavity for engagement to a plurality of coordinately placed notches located on a peripheral outside upper wall of the second tray functioning in cooperation with the sealing means to secure the receptacle in said closed book form.

11. A receptacle for receiving, packaging, and displaying relatively flat articles, which receptacle is opened and closed in book form, comprising:

an outside cover flexibly encasing an inner container consisting of a pair of cooperative opposing quadrilateral trays of rigid material constructed to receive and retain said articles; a first of said trays having a quadrilateral cavity formed therein defined by a first upstanding wall at the perimeter thereof and a second of said trays having at least two cavities of a defined geometric shape and size and further defined by a second upstanding wall at the outside limits of said geometric shape, whereby a first cavity of said two cavities cooperatively shares an intersecting volume common to said two cavities for receiving said articles;

a binding means of said outside cover located central to said trays being integral to said cover to function as a pivotal support axis allowing said receptacle to fold to a closed position for sealing of said receptacle and unfold to an open position for viewing and use of the contents constituting primarily said flat articles;

a sealing means integral to said cover located along a first side of said receptacle being common to said quadrilateral trays and opposing said binding means located at a second side of said receptacle common to said quadrilateral trays whereby said sealing means functions to secure said receptacle from separating at opposing contact surfaces of said two cooperative opposing quadrilateral trays when said receptacle is in said closed position;

the sealing means further including at least one foldable adhesive flap at an open end being said first side of said receptacle for sealing said receptacle; and the foldable adhesive flap further having an inner adhesive surface for adherence to outside adjoining walls of said trays in said closed position and a peelable removable liner to the outside of said adhesive surface for prevention of an accidental adherence to said outside adjoining walls.

12. A receptacle for receiving, packaging, and displaying relatively flat articles, which receptacle is opened and closed in book form according to claim 11, wherein said foldable adhesive flap is of a quadrilateral dimensioned configuration conforming to the shape of said open end of said receptacle and further comprising a tearable strip for opening said receptacle from a sealed position.

* * * * *